United States Patent Office.

JOHN B. RODGERS, OF ST. LOUIS, MISSOURI.

Letters Patent No. 102,161, dated April 19, 1870; antedated April 12, 1870.

IMPROVED COMPOUND TO BE USED IN TREATING RHEUMATISM AND OTHER DISEASES.

The Schedule referred to in these Letters Patent and making part of the same.

To all whom it may concern:

Be it known that I, JOHN B. RODGERS, of St. Louis, in the county of St. Louis and State of Missouri, have invented a new and valuable Improvement in Medical Compounds and Preparations thereof; and I do hereby declare that the following is a full, clear, and exact description of the same.

My invention relates to remedies for various diseases to which mankind is subject; and It consists in a novel combination, preparation, and application of ingredients intended to serve as efficient means for the purpose named.

To prepare my compound, I take from nine to eleven parts of sulphate of copper, and reduce it to a fine powder. I then take from two to three parts of chloride of sodium, and, after thorough pulverization, I mix the two ingredients thoroughly together in a mortar.

My method of applying this remedy is as follows, namely:

I take about two ounces of the compound and make it into a pad, by inclosing it between two circular pieces of cloth about three inches in diameter, one piece of cloth being strong muslin and the other linen. These pieces of cloth are stitched together around their edges, and then quilted in lines radiating from center to circumference. The pad, when thus prepared, is of a circular form, about two inches in diameter and half an inch in thickness. It is applied externally to the navel of the patient, the linen side next the skin, and is held in position by a suitable band around the body.

This remedy is designed for use in treating fever and ague, summer complaint, neuralgia, congestive chills, diarrhea, bilious fever, asthma, rheumatism, dumb ague, and other kindred ailments.

What I claim as my invention, and desire to secure by Letters Patent, is—

The medical compound herein described, compounded of the materials and applied in the manner substantially as specified.

In testimony that I claim the above, I have hereunto subscribed my name in the presence of two witnesses.

JOHN B. RODGERS.

Witnesses:
GEO. T. SMITH,
BENJ. LYNDS.